Sept. 29, 1959  L. M. FORBUSH  2,906,558
VEHICLE WHEEL FASTENING MEANS
Filed June 24, 1955  2 Sheets-Sheet 1

INVENTOR
Lothrop M. Forbush
BY L. D. Burch
ATTORNEY

Sept. 29, 1959 L. M. FORBUSH 2,906,558
VEHICLE WHEEL FASTENING MEANS
Filed June 24, 1955 2 Sheets-Sheet 2

INVENTOR
Lothrop M. Forbush
BY
L. D. Burch
ATTORNEY

United States Patent Office 2,906,558
Patented Sept. 29, 1959

2,906,558

VEHICLE WHEEL FASTENING MEANS

Lothrop M. Forbush, Ferndale, Mich., assignor to General Motors Corporation, Detroit, Mich., a corporation of Delaware Application June 24, 1955, Serial No. 517,812

1 Claim. (Cl. 301—9)

This invention relates to vehicle wheels in general and more particularly to means for fastening vehicle wheels to vehicle axles and the like.

Vehicle wheels are conventionally secured to wheel hubs, of vehicle axles, by means securing the wheel disc to a studded flange provided on the end of the wheel hub. The wheel disc is first centered upon the hub, the disc is then rotated to align the stud receiving apertures formed in the disc with the wheel hub studs, and lastly nut means with conical ends are threaded upon the studs to secure and make final centering adjustment of the disc relative to the wheel hub. Such combined centering and securing means make the changing of a vehicle wheel both difficult and cumbersome. It is not only difficult to align the holes provided in the wheel disc with the studs provided on the hub member, but care must be taken in tightening down the fastening means to provide a secure assembly and to concentrically locate the wheel relative to the vehicle axle. Unless the vehicle wheel is concentric with respect to the axis of rotation, notable wheel unbalance, undue tire wear and generally poor performance will follow.

It is now proposed to provide means particularly adaptable for securing a vehicle wheel to a wheel hub which assures precision centering of the wheel with respect to the hub in a minimum of time and with a minimum of effort. It is proposed to form the adjacent portions of the wheel disc and wheel hub members with mating face splines which will act similar to multiple keyways in assuring relative concentric alignment of the disc and hub members. It is further proposed that each face splined tooth theoretically come to a point at the axis of rotation of the vehicle wheel; the wedge tooth formation providing means for supporting the vehicle wheel upon the wheel hub. It is also proposed to make use of a threaded spinner type hub cap for holding the face splined wheel disc and wheel hub members in secure drive engagement. The spinner type hub cap is received within the end of the wheel hub and over the end of the axle shaft to protect such shaft end from road dirt and the like, while at the same time providing the aforementioned wheel fastening aspects.

It is further proposed to provide a wheel fastening arrangement which will enable locating the entire axle hub and nut assembly within the exterior dimensions of the vehicle wheel thereby providing more protection for such elements and a much more compact arrangement.

The proposed wheel fastening means provides for precision centering of a vehicle wheel with respect to a wheel hub and a simple and effective means permitting removal and replacement of a vehicle wheel with greater ease and convenience.

Figure 1:
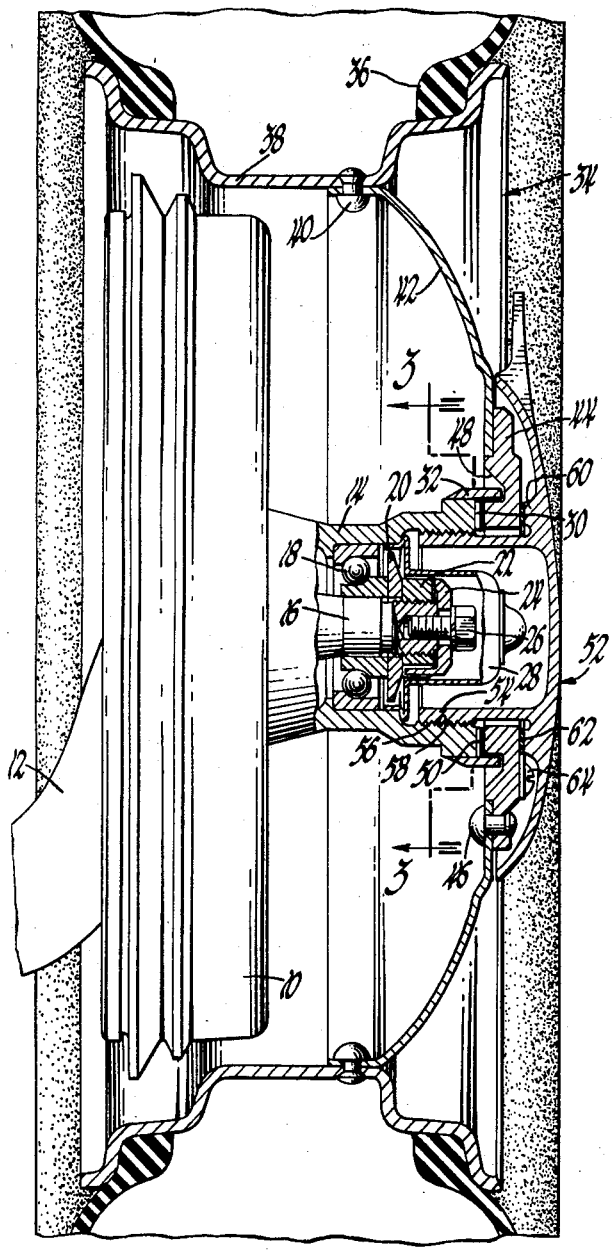
Figure 1 is a cross-sectional view of a part of a rear vehicle wheel assembly showing the proposed face spline connection and having the brake drum disposed within the wheel assembly.
Figure 2:
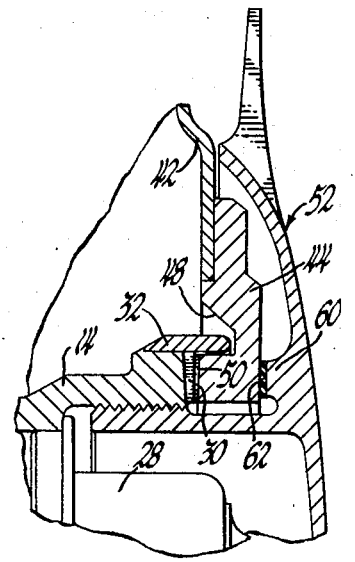
Figure 2 is an enlarged cross-sectional view of the face spline connection shown in Figure 1.
Figure 3:
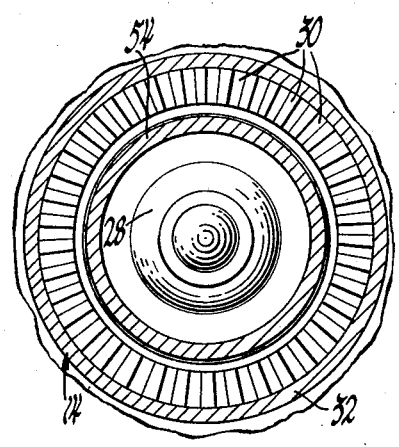
Figure 3 is a cross-sectional view of the spline connection shown in Figure 1 taken in the plane of line 3—3 and viewed in the direction of the arrows thereon.

Referring particularly to Figures 1, 2 and 3, there is shown a wheel arrangement wherein the principal concern is brake torque transmittal. A brake drum 10 including any acceptable brake means therewithin is mounted upon the end of an axle shaft or other vehicle support means 12 and includes a wheel hub 14 spaced apart from the axle shaft pin 16 by ball bearing means 18. A washer 20 is received on the axle shaft pin and nut means 22 are threaded thereon for holding the ball bearing means in place. Nut retainer means 24 are disposed over the end of the axle shaft pin and bolt means 26 threaded within the end of the axle shaft pin firmly secures the axle hub and nut assembly in place. A cap member 28 is snapped in place within the wheel hub 14 and over the aforementioned bearing retainer means.

The extreme end face of the wheel hub 14 is formed to provide an annulus of face splines 30, preferably having each spline tooth and way coming to a theoretical point at the wheel hub axis. A sleeve member 32 is secured near the end of the wheel hub 14 and extends beyond the end of the hub member and over the face splines 30 thereof to provide a recess in which the splines are located.

Secured to the wheel hub 14 is a vehicle wheel and tire assembly 34 which includes a tire member 36 and a wheel rim 38 secured by rivet or other means 40 to a wheel disc 42. The wheel disc 42 includes an inner annular member 44, in this instance secured thereto by rivet means 46, and which is formed to provide an annular groove or recess 48 for receiving the sleeve member 32 of the wheel hub and provides preliminary wheel locating means. Inwardly of the groove 48 and on the same side thereof is provided an annulus of face splines 50 adapted to be engaged and mated with the face splines 30 provided on the extreme end of the wheel hub 14. These face splines and splineways are also preferably formed formed to come to a theoretical point at the hub axis of rotation.

The groove 48 provided in the wheel disc member 44 assists in the preliminary location of the wheel and tire assembly 34 upon the wheel hub 14 by being adapted to receive the sleeve member 32 therewithin. Such sleeve member 32 assists in temporarily supporting the wheel assembly 34 while the face splines 30 and 50, provided on the disc member 44 and the end of the wheel hub 14, respectively, are properly aligned.

A spinner type hub cap 52 is adapted to hold the wheel disc face splines 50 of the annular member 44 in mating engagement with the face splines 30 of the wheel hub 14. The central portion of the hub cap member 52 is formed to provide a sleeve 54 received within the end of the wheel hub 14 and which sleeve is externally threaded, as at 56, for engagement with the internal threads 58 provided within the end of the wheel hub 14. The hub cap member 52 is also provided with an inner raised annular portion 60 engaging the wheel disc member 44 opposite the face splines 50 thereof for more effectively urging the wheel assembly 34 and hub member 14 into secure engagement.

In order that the hub cap member 52 may lie closely adjacent the wheel disc 42 for maximum protection of the proposed fastening means while still providing a maximum spline engaging effort, it may be desirable to provide shim means 62 between the wheel disc member 44 and the raised annular portion 60 of the hub cap member. The shim means 62 may be secured to the wheel disc member by fastening means as shown at 64.

The face splines 50 of the wheel disc act as multiple keys or keyways relative to the face splines 30 of the wheel hub 14. The face splines thus concentrically locate the wheel disc relative to the wheel hub member. Since the face splines and splineways are also wedge-shaped, being formed to come to a theoretical point at the axis of rotation of their respective members, the face splines 30 and 50 also act to support the vehicle wheel upon the wheel hub member.

Figure 4:
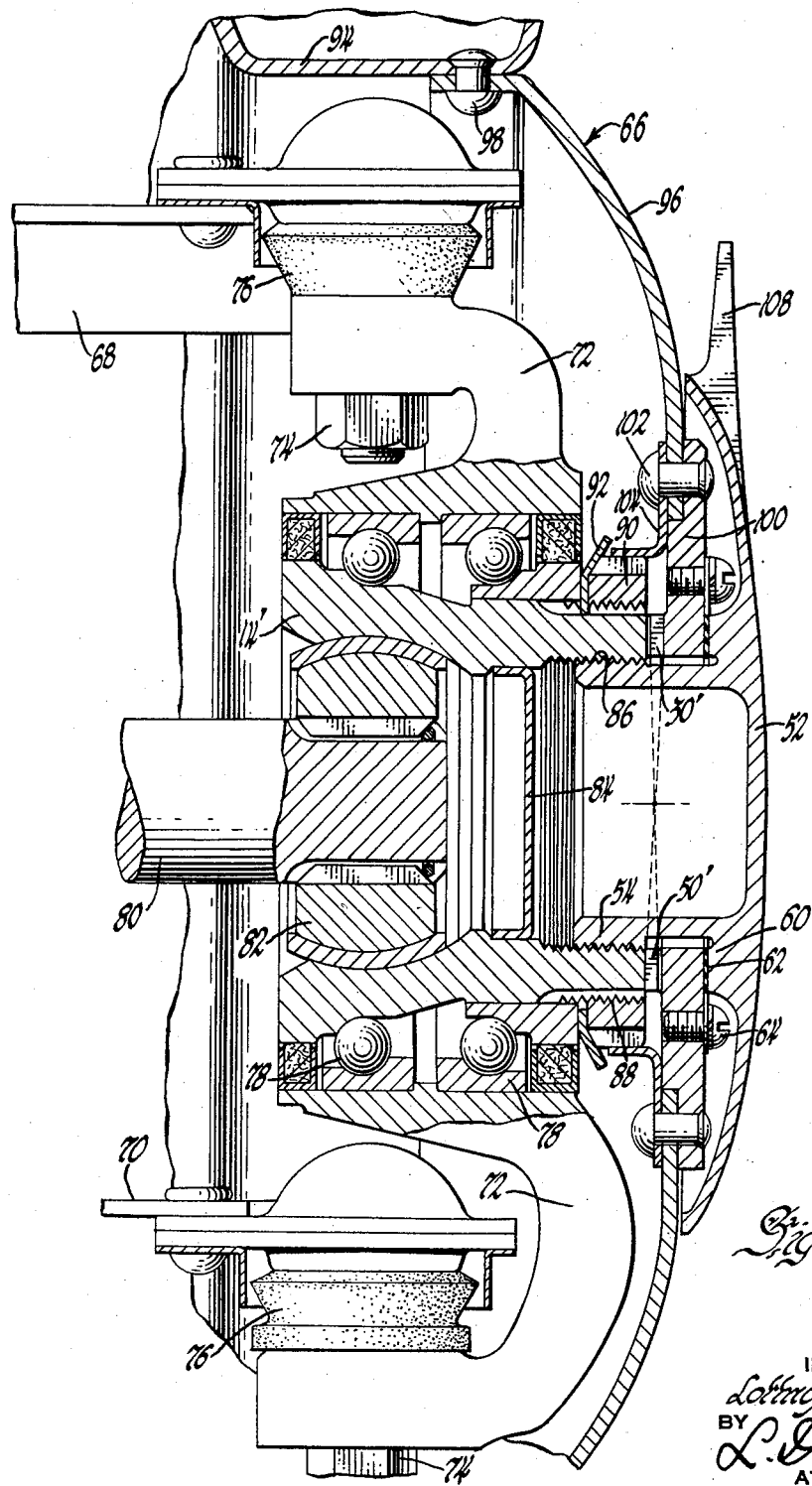
Figure 4 is a cross-sectional side elevation view of a drive wheel assembly showing a modified arrangement of the proposed fastening means.

Referring now to Figure 4, there is shown a front wheel vehicle drive assembly employing the proposed fastening means. In this particular instance a wheel assembly 66 is mounted on the end of the wishbone arms 68 and 70 by means 72 secured to such arms by fastening means 74 and resilient sealing members 76 and which retains the hub member 14' within sealed ball bearing means 78. The end of the axle shaft 80, in this instance, is provided with universal joint drive means 82. The outer end of the axle shaft 80 is protected by a cap member 84 snapped within the wheel hub 14'. The end of the wheel hub 14' is internally and externally threaded, as at 86 and 88, and the extreme end face thereof is provided with an annulus of face splines 30' of the type herein proposed. Externally threaded upon the wheel hub 14' is an annular preliminary wheel bearing adjusting means 90 which also serves as centering means backed up by a lock washer 92 separating the preliminary centering means from the inner race of one of the ball bearing means 78.

The wheel and tire assembly 66 includes the wheel rim 94 and the disc member 96 secured thereto by rivet means 98. The disc member 96 also includes an inner annular member 100 secured to the disc, in this instance by rivet means 102, and which has the side face adjacent the wheel hub provided with an annulus of face splines 50', according to the teaching of this invention, for mated engagement with the face splines 30' provided at the extreme end of such hub. A flanged member 104 is secured to the inner side of the wheel disc 96 by the same fastening means 102 that secures the annular member 100 to such disc. Such flanged means 104 assists in the preliminary centering of the wheel assembly 66 upon the annular member 90 and disposes the face splines 30' and 50' of the wheel hub and wheel disc member, respectively, in proper aligned and mating engagement.

The hub cap member 52 is again of the spinner type including dog ears 108, the center sleeve portion 54 externally threaded within the hub member, and the inner annular ledge 60 and engages the wheel disc member 100 directly opposite the spline faces formed thereon. Shim 62 and fastening means 64 will again be noted.

In each of the proposed face spline wheel fastening arrangements here described, it will be noted that the hub cap member 52 is received in threaded engagement by the wheel hub 14 or 14' and such hub cap member itself is adapted to hold the wheel disc member in secure engagement with the wheel hub member. The threads provided are in all instances, of course, right or left-hand threads depending upon the direction of wheel travel. The vehicle wheel assembly may be readily removed by grasping the dog ears 108 of the spinner type hub cap and unthreading the same from the wheel hub 14 or 14' which will leave the vehicle wheel assembly supported on the wheel hub by the wedged face splines or suspended for the moment on the wheel hub 14 or 14' by the preliminary centering means 32 or 90 provided. The wheel assembly may then be readily removed and a replacement wheel assembly quickly disposed in its place with greater ease and more efficiency than has heretofore been possible. The spinner type hub cap is then received in threaded engagement with the hub member and is tightened down to securely hold the wheel disc member and hub member in firm engagement.

I claim:

In a vehicle wheel mount, a wheel hub and a wheel disc mounted on said hub and a hub cap securing said disc to said hub, said hub having internal threads formed therein and face splines formed on the outer end thereof and preliminary wheel disc centering means positioned radially outward of said splined outer end, said wheel disc being comprised of an outer annular member having a wheel rim secured to the outer periphery thereof and an inner annular member secured to the inner periphery thereof, said inner annular member having face splines mating with said hub face splines and an annular recess receiving said hub preliminary wheel disc centering means and cooperating therewith during assembly of the mount so that said wheel disc is initially centered relative to said hub, said hub cap having a base and an externally threaded section threadedly engaging said hub internal threads and an annular face formed on said base and base spinner means for threading said hub cap into and out of said hub, said annular hub cap face engaging said wheel disc inner annular member on the side opposite said face splines and holding said annular member face splines in engagement with said hub face splines so that said wheel disc and said hub are locked for rotation together.

References Cited in the file of this patent

UNITED STATES PATENTS

| | | |
|---|---|---|
| 1,099,770 | Simmons | June 9, 1914 |
| 1,301,506 | Riise | Apr. 22, 1919 |
| 1,401,815 | Powell | Dec. 27, 1921 |

FOREIGN PATENTS

| | | |
|---|---|---|
| 448,965 | France | Feb. 14, 1913 |
| 269,605 | Switzerland | Oct. 16, 1950 |
| 440,816 | Germany | Feb. 16, 1957 |